Jan. 20, 1925.
W. L. MITCHELL
FLOOR BOARD
Filed May 26, 1924
1,523,553
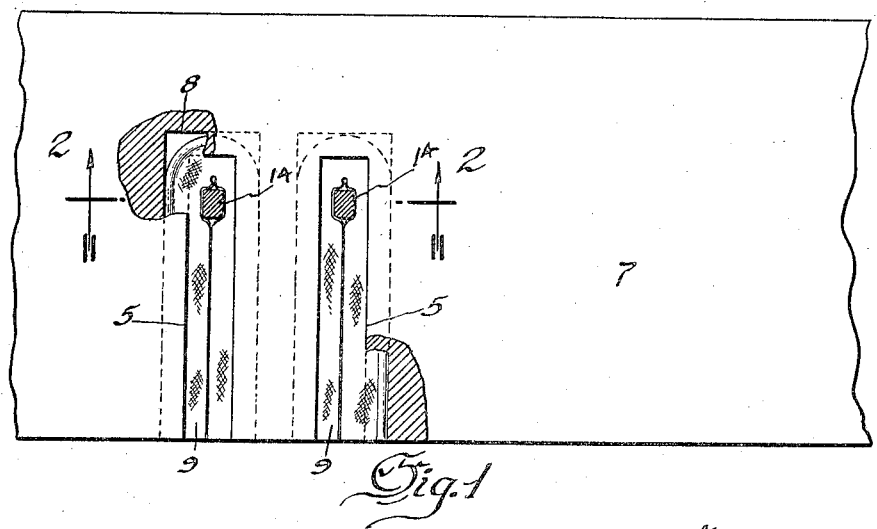
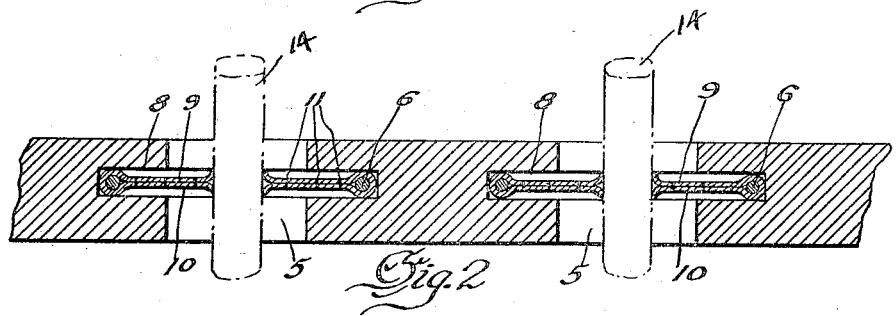
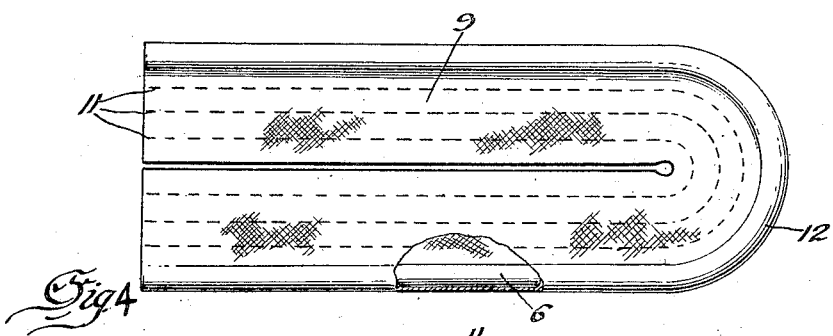
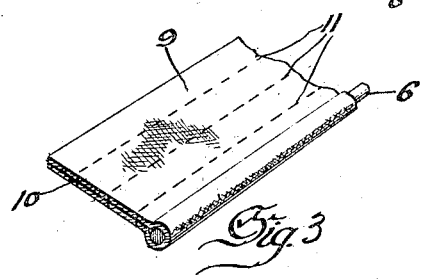
INVENTOR
William Ledyard Mitchell
BY HIS
ATTORNEY Patented Jan. 20, 1925.

1,523,553

UNITED STATES PATENT OFFICE.

WILLIAM LEDYARD MITCHELL, OF GROSSE POINTE FARMS, MICHIGAN.

FLOOR BOARD.

Application filed May 26, 1924. Serial No. 715,830.

*To all whom it may concern:*

Be it known that I, WILLIAM LEDYARD MITCHELL, a citizen of the United States, and resident of the village of Grosse Pointe Farms, in the county of Wayne and State of Michigan, have invented certain new and useful Improvements in Floor Boards, of which the following is a specification, reference being had to the accompanying drawings.

It is the primary object of my invention to provide a simple and economical means for closing the openings in automobile floor boards usually provided for the accommodation of brake and clutch pedals. I desire it to be understood, however, that the invention is equally applicable for use in various other openings in such floor boards as it is desired to prevent the passage of fumes, water and dirt therethrough.

With these and other objects in view my invention consists in the arrangement, combination and construction of the various parts of my improved device as described in the specification, claimed in my claims and shown in the accompanying drawings in which:

Fig. 1 is a top or plan view of a floor board showing my improved guards thereon.

Fig. 2 is a sectional view taken on line 2—2 of Fig. 1.

Fig. 3 is a detailed view with certain parts cut away showing the construction of the guard employed in my invention.

Fig. 4 is a top or plan view of the guard in one form.

I have shown a floor board 7 having openings 5 therein such as are usually provided in automobile floor boards for the accommodation of the brake and clutch pedals 14. The faces of the openings 5 are provided with grooves 8.

For the construction of a suitable guard for the openings 5 I utilize a strip of cloth, coated fabric or other suitable material which may be doubled upon itself to form a top layer 9 and a bottom layer 10. The two layers are then joined together by any desired number of rows of stitching 11 after which a wire 6 is inserted between the layers adjacent the bend in the material. The material is then cut to any desired length and is bent upon itself so as to form a substantially U-shaped guard indicated generally as 12 in Fig. 4. The outer edges of this guard are then inserted in the grooves 8 where they will be held in place by the tension of the wire 6 with the inner edges of the cloth brought substantially together so as to prevent the passage of air, smoke, dirt and water, or other foreign matter therethrough and through the openings 5 in the floor board.

As above pointed out, my improved guard may be applied to various openings in the floor board as the occasion requires. Furthermore, the guard may be formed in any desired formation and may particularly be formed in a circle instead of in U-shaped formation according to the desires of the user.

It will further be noted that the stitching 11 serves not only to join the two layers of the cloth together, but to stiffen the cloth so that it will more readily remain in its original condition and not droop downwardly.

It is obvious that various other changes may be made in the arrangement, combination and construction of the various parts of my improved device without departing from the spirit of my invention, and it is my intention to cover by my claims such changes as may be reasonably included within the scope thereof.

What I claim is:

1. A floor board having an opening therein, a guard adapted to substantially close said opening, means on said floor board for engaging at least a portion of said guard at least a portion of said guard being provided with tensioning means and said guard being secured to said floor board engaging portion by the tension of the guard.

2. A floor board having an opening therein, a guard adapted to substantially close said opening, means on said floor board for engaging at least a portion of said guard and means in said guard exerting outward pressure on said engaging means sufficient to secure the guard to said floor board.

3. A floor board having an opening therein, a guard adapted to substantially close said opening, a groove in the edges of said opening in which the outer edges of said guard are positioned, and means in said guard exerting outward pressure sufficient to retain said guard in said groove.

4. A floor board having an opening therein, a guard adapted to substantially close said opening, means on said board engaging the edge of said guard, and means in said guard exerting outward pressure sufficient to retain it in said engaging means.

5. A floor board having an opening therein, a guard adapted to substantially close said opening, a groove in the edges of said opening in which the outer edges of said guard are positioned, and means in said guard confining said edges thereof in said groove under tension.

6. A floor board having an opening therein, a guard adapted to substantially close said opening, means on said floor board for engaging at least a portion of said guard, said engaged portion of the guard having a wire therein adapted to exert outward pressure on said engaging portion and thus secure said guard to said floor board.

7. A floor board having an opening therein, a guard adapted to substantially close said opening, a groove in the edges of said opening in which the outer edges of said guard are positioned, and a wire in said guard adapted to exert pressure therein to hold said edges in said grooves.

8. A floor board having an opening therein, a guard for said opening consisting of a piece of material bent on itself so as to form a double thickness, means on said floor board for engaging at least a portion of said guard, a tension member disposed in the bend of said material and adapted to exert outward pressure on said engaging portion so as to secure said guard to said floor board.

9. A floor board having an opening therein, a groove in the edge of said opening, a guard for said opening consisting of a piece of material bent on itself so as to form a double thickness the outer edge of said material being disposed in said groove, and a tension member disposed in the bend adapted to exert outward pressure thereon so as to secure said guard to said floor board.

10. A floor board having an opening therein, a guard for said opening consisting of a piece of material bent on itself so as to form a double thickness, means on said floor board for engaging at least a portion of said guard, a wire disposed in the bend of the said material and adapted to exert outward pressure upon said engaging portion so as to secure said guard to said floor board.

11. A floor board having an opening therein, a groove in the edge of said opening, a guard for said opening consisting of a piece of material bent on itself so as to form a double thickness the outer edge of said material being disposed in said groove, and a wire disposed in the bend adapted to exert outward pressure thereon so as to secure said guard to said floor board.

12. A floor board having an opening therein, a groove in the edge of said opening, a guard for said opening consisting of a piece of material bent on itself so as to form a double thickness the outer edge of said material being disposed in said groove, and a tension member disposed in the bend adapted to exert outward pressure thereon so as to secure said guard to said floor board, and said thicknesses of material being sewed together so as to hold said tension member in place and at the same time add stiffness to said material.

13. A floor board having an opening therein, a groove in the edge of said opening, a guard for said opening consisting of a piece of material bent on itself so as to form a double thickness the outer edge of said material being disposed in said groove, and a wire disposed in the bend adapted to exert outward pressure thereon so as to secure said guard to said floor board, and said thicknesses of material being sewed together so as to hold said wire in place and at the same time add stiffness to said material.

14. A floor board having an opening therein, a groove in the edge of said opening, a guard for said opening consisting of a piece of material bent on itself so as to form a double thickness, a wire disposed in the bend, said material and wire being bent into somewhat U shaped formation, with the outer edges thereof disposed in said groove.

15. A floor board having an opening therein, a groove in the edge of said opening, a guard for said opening consisting of a piece of material bent on itself so as to form a double thickness, a wire disposed in the bend, said material and wire being bent into somewhat U shaped formation, with the outer edges thereof disposed in said groove, and said thicknesses of material being sewed together so as to hold said wire in place and add stiffness to the material.

WILLIAM LEDYARD MITCHELL.